United States Patent Office 3,767,589
Patented Oct. 23, 1973

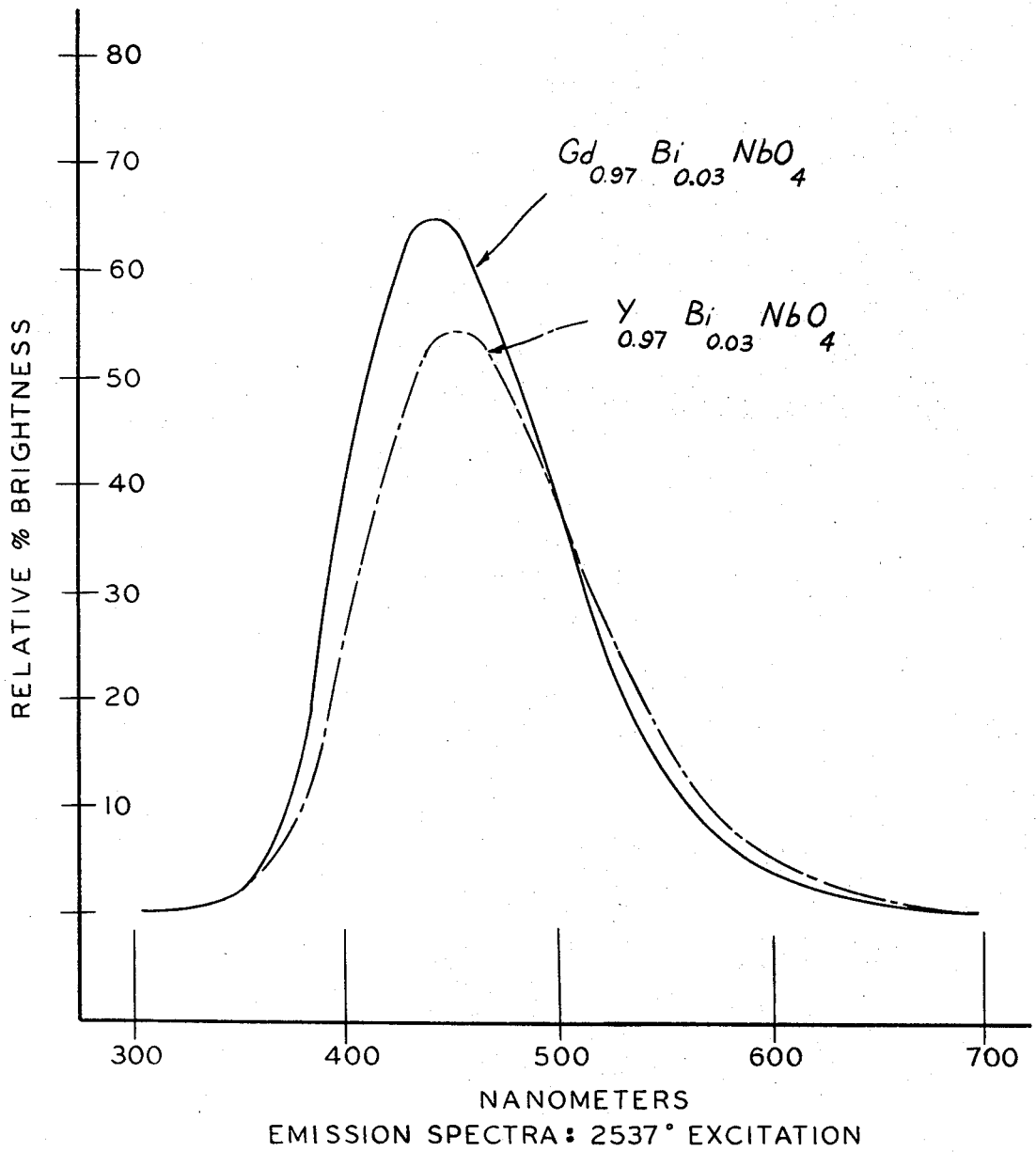

---

3,767,589
BISMUTH-ACTIVATED GADOLINIUM NIOBATE PHOSPHORS
David A. Grisafe, Lawrence, Kans., and Carl W. Fritsch, Jr., Dushore, Pa., assignors to GTE Sylvania Incorporated
Filed May 22, 1972, Ser. No. 255,771
Int. Cl. C09k 1/46
U.S. Cl. 252—301.4 R
7 Claims

ABSTRACT OF THE DISCLOSURE

Compounds of bismuth-activated gadolinium niobate are novel and useful blue-emitting phosphors under cathode ray and U.V. excitation.

BACKGROUND OF THE INVENTION

This invention relates to synthetic inorganic phosphors. More particularly the invention relates to compounds of bismuth-activated gadolinium niobate which emit light in the blue region of the visible spectrum under excitation with suitable radiation such as cathode ray or ultraviolet.

Phosphors are known products of commerce. Generally, the term is employed in the art to describe luminescent or fluoroscent solids which comprise two essential ingredients: a host matrix and an activator. There are many known host materials including niobates, silicates, phosphates, vanadates, etc. Two known niobate phosphors are yttrium niobate and lanthanum niobate ($YNbO_4$ and $LaNbO_4$ respectively). These phosphors are both self-luminescent and activated by bismuth. Of these two, the yttrium niobate bismuth is the brightest; however, it would be advantageous if a brighter niobate phosphor could be found, as well as one which emitted more in the blue region of the spectrum.

OBJECTS AND SUMMARY OF THE INVENTION

Accordingly, it is an object of this invention to provide such a phosphor.

This and other objects are accomplished in one aspect of the invention by the provision of phosphor compounds of bismuth-activated gadolinium niobate. More particularly, a phosphor having the general formula $Gd_{1-x}Bi_xNbO_4$ where $0 < x < 0.2$ is provided.

BRIEF DESCRIPTION OF THE DRAWING

The single figure depicts the relative brightness and the color peaks of the phosphor of the invention and a prior art phosphor.

DESCRIPTION OF THE PREFERRED EMBODIMENTS

Referring now to the invention with greater particularity there are herein described phosphors whose compositions can be shown by the general formula $Gd_{1-x}Bi_xNbO_4$ where $0 < x < 0.2$. Such phosphors yield blue luminescence when exposed to cathode rays or ultraviolet radiation of 2537 A. wavelength. The single figure compares one of the specific phosphors of this invention, namely $$Gd_{0.97}Bi_{0.03}NbO_4$$

and a prior art phosphor $Y_{0.97}Bi_{0.03}NbO_4$. It will be seen from a comparison of the peaks of the respective phosphors that the gadolinium niobate is both brighter and "bluer"; i.e., is shifted more toward the blue end of the visible spectrum.

It should here be noted that, while as noted above, the yttrium and lanthanum niobate compositions are self-luminescent, gadolinium niobate without activation by bismuth is inert under both cathode ray and ultraviolet excitation.

The phosphors described herein can be prepared from any starting materials which will provide the phosphors with the desired amounts of the oxides of gadolinium, bismuth and niobium in the final product. In heat treating these phosphors, a variety of non-reducing atmospheres such as oxygen, air, carbon dioxide, etc., can be employed. While these phosphors can generally be fired in either covered or uncovered containers, when high temperature and/or long periods of time are employed it is preferable to utilize covered containers to minimize the loss of bismuth due to volatility.

The following examples illustrate without undue limitation the production of phosphors according to this invention.

EXAMPLE 1

15.701 g. of gadolinium oxalate hydrate, 6.646 g. $Nb_2O_5$ and 0.350 g. $Bi_2O_3$ are blended in any one of several conventional dry methods or by a wet method using a volatile inert carrier such as acetone. The mixture is heated between 600° C. and 1650° C. for at least 30 minutes, preferably remixed as above to insure homogeneity and then preferably refired between about 1000° C. and 1650° C. in air for at least 30 minutes. The firing time and temperature can be varied so long as they are sufficient to form the gadolinium niobate compound. The resulting phosphor has as its stoichiometry $$Gd_{0.97}Bi_{0.03}NbO_4$$

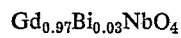

and luminesces blue under ultraviolet (2537 A.) or cathode ray excitation.

EXAMPLE 2

14.568 g. of gadolinium oxylate hydrate, 6.646 g. $Nb_2O_5$ and 1.165 g. $Bi_2O_3$ are mixed as described in Example 1. The mixture is heated at 600° C. for one hour and then at 1350° C. for several hours (e.g., three). The resulting phosphor luminesces blue under ultraviolet or cathode ray excitation and has the formula $$Gd_{0.9}Bi_{0.1}NbO_4$$

EXAMPLE 3

9.854 g. of gadolinium oxylate hydrate, 4.430 g. optical grade $Nb_2O_5$ and 0.039 g. $Bi_2O_3$ are mixed as described in Example 1. The mixture is fired at 700° C. for one hour, remixed in acetone and refired in a covered crucible at about 1315° C. for several hours. The resulting phosphor, $Gd_{0.995}Bi_{0.05}NbO_4$, luminesces blue under ultraviolet or cathode ray excitation.

EXAMPLE 4

Any of the above proportions of materials can be mixed as in Example 1 and fired according to the following schedule: heat the mixture at about 600° C. to 800° C. for about one hour, remix and refire between about 1000° C. to 1400° C. for several hours with a final firing between about 1500° C. to 1650° C. for at least several minutes. The phosphors produced are substantially identical to those of Examples 1–3 respectively, depending on the proportions of the starting materials.

It will be seen from the above that there is herein provided a new and novel phosphor composition that exhibits wide latitude in formulation and in the manufacturing process.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A phosphor material having the general formula $Gd_{1-x}Bi_xNbO_4$ wherein $0<x<0.2$ and Bi is present in an effective amount to achieve luminescence.
2. The phosphor of claim 1 wherein $x$ is 0.03.
3. The phosphor of claim 1 wherein $x$ is 0.1.
4. The phosphor of claim 1 wherein $x$ is 0.005.
5. The method of making a blue emitting phosphor of the general formula $Gd_{1-x}Bi_xNbO_4$ wherein $0<x<0.2$ which comprises the steps of blending together to form a mixture of materials which when heated at between 600° C. and 1650° C. will yield gadolinium oxide, bismuth oxide and niobium oxide, heating said mixture between 600° C. and 1650° C. for at least 30 minutes; remixing said mixture; and then refiring said remixed mixture in air at between 1000° C. and about 1315° C. for at least 30 minutes.
6. The method of claim 5 wherein said oxide yielding materials are mixed with acetone and said fired mixture is remixed with acetone.
7. The method of claim 3 wherein said gadolinium oxide yielding material is gadolinium oxylate hydrate; said niobium oxide yielding material is $Nb_2O_5$; and said bismuth oxide yielding material is $Bi_2O_3$.

References Cited

UNITED STATES PATENTS

| | | | |
|---|---|---|---|
| 3,250,722 | 5/1966 | Borchardt | 252—301.4 R |
| 3,427,566 | 2/1969 | Hoskins et al. | 252—301.4 R |
| 3,496,482 | 2/1970 | Hoskins et al. | 252—301.4 R |
| 3,503,006 | 3/1970 | Hoskins et al. | 252—301.4 R |
| 3,338,841 | 8/1967 | Brixner | 252—301.4 R |

OTHER REFERENCES

Sanatona et al.: "Chemical Abstracts," vol. 63, 1965, p. 3867e.

OSCAR R. VERTIZ, Primary Examiner

J. COOPER, Assistant Examiner

UNITED STATES PATENT OFFICE
CERTIFICATE OF CORRECTION

Patent No. 3,767,589      Dated October 23, 1973

Inventor(s) David A. Grisafe and Carl W. Fritsch, Jr.

It is certified that error appears in the above-identified patent and that said Letters Patent are hereby corrected as shown below:

Col. 2, line 49  "0.05"    should be  "0.005"

Col. 4, Claim 7, line 1  "3"  should be  "5"

Signed and sealed this 7th day of May 1974.

(SEAL)
Attest:

EDWARD M. FLETCHER, JR.
Attesting Officer

C. MARSHALL DANN
Commissioner of Patents